FRAMES FOR STRACKING PALLETS

Original Filed Dec. 26, 1967 2 Sheets-Sheet 1

INVENTOR:

BY Harold W. Eagland
Kenway Jenney & Hildreth

FRAMES FOR STRACKING PALLETS

Original Filed Dec. 26, 1967 2 Sheets-Sheet 2

INVENTOR:

BY Harold W. Eagland

Kenway Jenney & Hildreth

United States Patent Office

Re. 28,163
Reissued Sept. 17, 1974

28,163

FRAMES FOR STACKING PALLETS

Harold Walker Eagland, deceased, late of St. Annes, England, by Phyllis Eagland, executor, St. Annes, England, assignor to Palletower Limited, St. Annes, Lancashire, England

Original No. 3,447,490, dated June 3, 1969, Ser. No. 693,466, Dec. 26, 1967. Application for reissue Jan. 19, 1971, Ser. No. 107,695

Claims priority, application Great Britain, Dec. 30, 1966, 58,251/66

Int. Cl. B65d *19/18*

U.S. Cl. 108—53 3 Claims

Matter enclosed in heavy brackets [ ] appears in the original patent but forms no part of this reissue specification; matter printed in italics indicates the additions made by reissue.

ABSTRACT OF THE DISCLOSURE

A frame for stacking pallets vertically, which is formed of 4 adjoining sections slidably interlocked at each corner. The frames are formed to rest on the peripheral upper surface of each pallet and include flange sections to restrain horizontal motion relative to the pallets.

This invention relates to a method of stacking pallets by means of frames and to frames for use in stacking pallets and trays according to the method.

In present day industry where pallets are used to carry articles it is a difficulty that often the amount of factory space is not used most economically and in the case where the loaded pallets are not stacked one on top of the other, a huge amount of factory storage space is wasted.

Various methods and means for arranging the pallets to be stacked one on top of the other have been proposed.

One such method is to provide a box-like open free standing frame having shelves spaced vertically by the amount the pallets are to be spaced, the loaded pallets then being placed on the shelves. This has the disadvantage that the frame takes up a considerable space itself and unless actually loaded with pallets this space is wasted. Also the frame stands on the ground and therefore must be of overall dimensions greater than the pallet itself with the result that space again is wasted.

Another arrangement envisages mounting four posts on the corner of the pallet and then mounting another pallet on the tops of the posts. This suffers from the disadvantage that the support provided by the posts for the upper pallets is very unstable, particularly where the stacked pallets are being carried by a forklift truck which they not infrequently are.

It is an object of this invention to provide a method and means which aims at obviating or mitigating the abovenamed drawbacks.

According to this invention there is provided a method of stacking pallets one above the other, comprising mounting on a first pallet above the top peripheral edge thereof, and in an upright manner, a collapsible frame which in effect extends the sides of the pallet upwardly, and mounting a further pallet on top of the frame.

Further, according to the present invention there is provided a frame for use in the method aforesaid, said frame comprising detachably interconnected section and being adopted to lie above the top peripheral edge of a pallet to form continuations of the pallet sides, to extend in an upright manner therefrom and to define a support for a further pallet to be placed on top thereof.

Preferably the sections slidably interfit. The frame sections are preferably for a rectangular pallet and comprises four in number one for each end of the pallet and one for each side. Each section is preferably of metal bar construction and the sliding connection is such that in erecting the frame on pallet, the end sections are mounted on the pallet and the side sections are lowered vertically to effect the sliding interfit with the end sections.

An embodiment of the invention will now be described, by way of example only, with reference to the accompanying drawings wherein.

Figure 1:
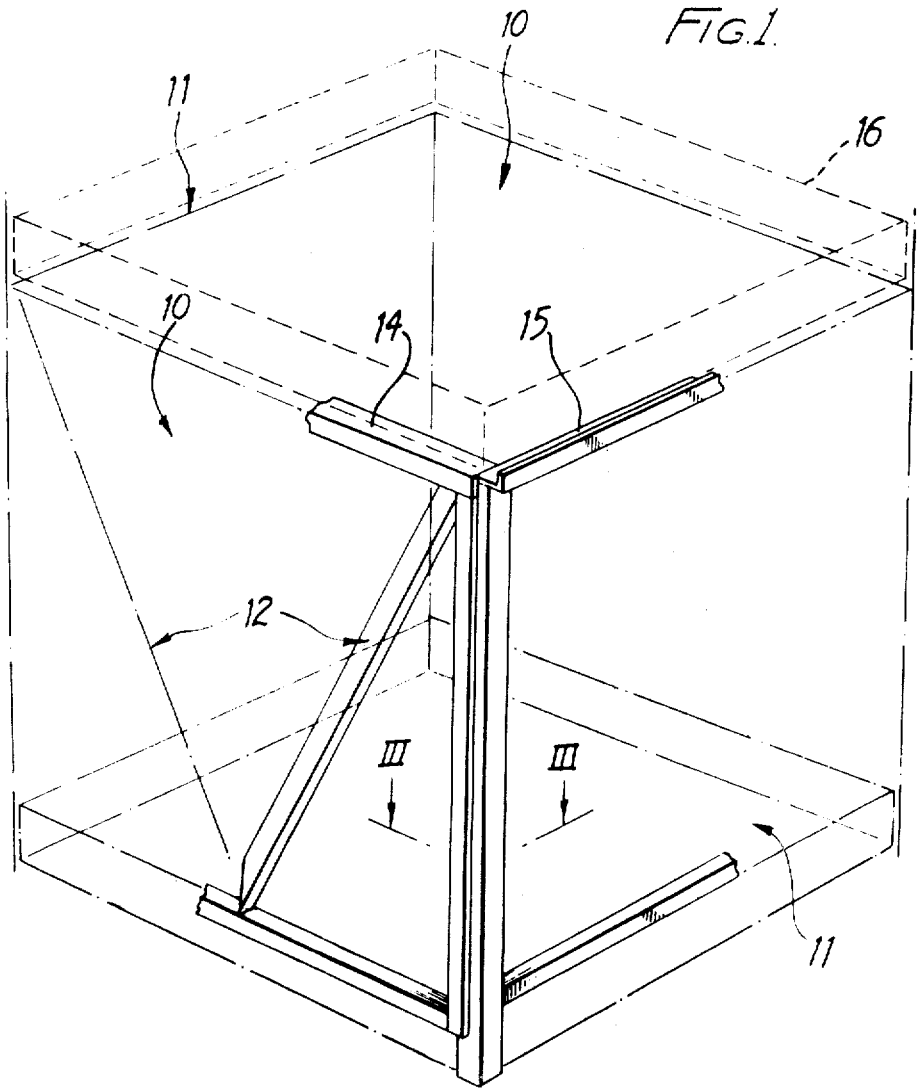
FIG. 1 is a perspective view, partly in diagrammatic form, of a frame according to the invention.

Referring to the drawings a frame for stacking rectangular pallets comprises four sections, two side sections 10 and two end sections 11 which detachably interfit at the upright corners. In FIG. 1, only one upright corner is shown in full lines as all the corners are the same. Each section is rectangular in shape and has cross struts indicated by 12 for strengthening purposes. The frame is tailored to be mounted on the top peripheral edge of a pallet 13 so that the sections in effect extend the pallet sides and ends upwardly and top plates and angles 14 and 15 serve for supporting an upper pallet 16 indicated in dotted lines in FIG. 1. Another frame according to the invention may be mounted on the top of the upper pallet 16 and so on. The handling of the pallets will usually be done by fork-lift trucks and pallets 13 and 16 will be constructed for this purpose. The pallet may be lifted with the frame mounted thereon.

Figure 2:
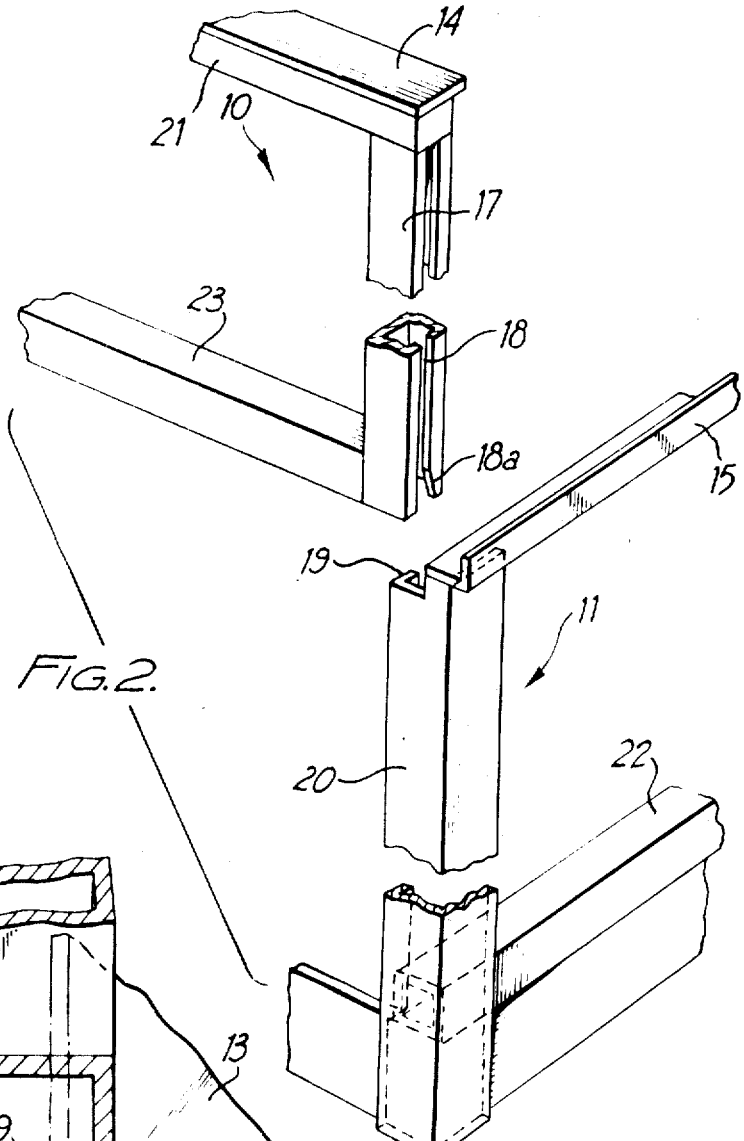
FIG. 2 is a perspective view to an enlarged scale showing how frame sections are interfitted.

In FIG. 2 there is shown the structure which enables the interfitting of the side and end sections 10 and 11. Of the section 10 the upright end post 17 is hollow square section and the end face has a longitudinal slot 18, which slot has a widened end 18A to provide a lead-in for a flange 19 on the adjacent end post 20 of the adjacent end section 11. The end post 20 is generally L-shaped in cross section but the edge of one arm of the L-section is provided over the major part of the length of the post with the flange 19. The flange is removed to an extent equal to the thickness of the upper cross beam 21 of the side section 10 at the top end and by the height of the pallet 13 or slightly less at the lower end. By doing this, the cross bar 21 can rest on the cut away part of the post 20 and so the plates 14 lie flush with cross angles 15 of the section 11 and at the lower end the pallet can snugly abut the inner faces of the L-shaped post 20. The lower end of the post 20 may or may not extend to the ground. More particularly it may be made greater in length than the depth of the pallet so that the frame is free standing and although the pallet is held captive the weight of superimposed pallets is not imposed thereon. The lower part which fits round the sides and ends of the pallet below the peripheral top edge has the main purpose of preventing horizontal relative movement between the pallet and frame but it may or may not serve another function.

The upper cross angle 15 of the section 11 is an angle iron to retain the upper pallet 16 in position. The bar 15 is welded to post 20.

Section 11 has a lower cross bar 22 the ends of which lie on the inside of the base of the L-sections of the posts 20 (see FIG. 3); bar 22 is welded to the posts 20.

As is clearly seen in FIG. 2, the end sections 11 are first of all placed with the lower crossbars 22 resting on the periphery of the pallet 13, the corners of said pallet fitting snugly into the inner faces of the L-shaped posts. Next the side sections 10 are simply raised above the end sections and are lowered, ensuring that flanges 19 engage in the posts 17 through slots 18. Now the frame is complete and an upper pallet may be placed on the top thereof and a further frame placed thereon. Of course the articles may be stacked on the pallets before or after the erection of the frame.

Figure 3:
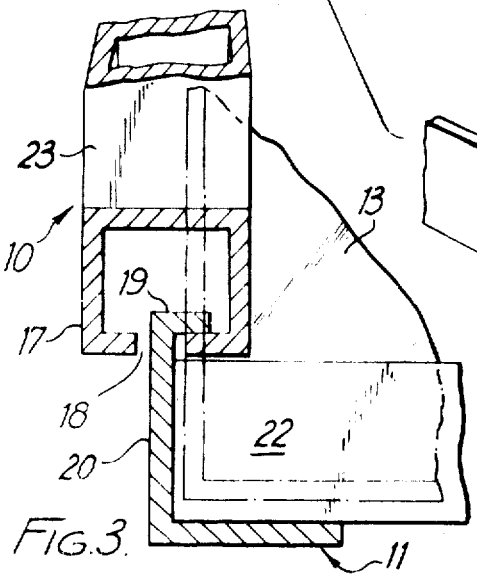
FIG. 3 is a sectional plan taken on the line III—III of FIG. 2.

On referring to FIG. 3 it will be seen that the lower crossbars 22, 23 rest on the periphery of the pallet and not on the ground. In practice it has been found that the lower crossbars need project as little as half an inch towards the interior of the pallet, and thus the minimum of space is used up.

The frame sections 10, 11 will generally be of metal, for example iron, steel or alloy, but it may be that some synthetic plastics material may be used.

Modifications may be made, for example, the frame may be of another shape to suit different shaped pallets and instead of the sections interfitting there may be means for linking them together.

The above described frame provides several advantages over existing arrangements viz, (1) The pallet surface area is reduced by a minimum amount, e.g. 4½%, and yet increases the overall dimensions by only a small amount in each direction;

(2) It is very strong because of the connection between sections over substantially the height of the corner posts;

(3) The frame has no internal or external projections which could cause damage;

(4) When pallets are stacked two or more high, the weight is evenly distributed around the entire pallet periphery preventing pallet flexing during lifting;

(5) The frame can be very simply erected or dismantled by one operator.

(6) The rigidity of the frame increases when the pallets are stacked two or more high on top of it.

What is claimed is:

1. A frame for use in stacking pallets one above the other, said frame comprising, a plurality of frame sections for mounting on the top peripheral edges of a pallet, means defining sliding interfits between the vertical adjoining edges of said sections when said sections are mounted on top of a pallet resting on the pallet top peripheral edge, extensions on the bottoms of said sections which overlap the sides and ends of the pallet to prevent the frame from moving horizontally relative to the pallet, means defining a seat at the top end of the frame for a further pallet, and lateral side [and end] stops to prevent any pallet mounted on the top of the frame from moving *laterally* horizontally relative to the frame.

2. A frame according to Claim 1, wherein each sliding interfit between sections is formed by a box sectioned post with a longitudinal slot cut in one side on one section and a flange, lip or tongue which can slide in the slot on the adjacent section.

3. A frame according to Claim 2, wherein the frame sections are for a rectangular pallet and comprise four in number, one for each end of the pallet and one for each side.

References Cited

The following references, cited by the Examiner, are of record in the patented file of this patent or the original patent.

UNITED STATES PATENTS

| | | | |
|---|---|---|---|
| 2,676,776 | 4/1954 | Townson | 108—53 |
| 2,776,775 | 1/1957 | Averill | 108—53 X |
| 2,863,568 | 12/1958 | Skhbie | 108—53 |
| 2,935,284 | 5/1960 | Berry | 108—53 |
| 2,940,697 | 6/1960 | Machielse | 108—53 X |
| 2,956,763 | 10/1960 | D'Arce | 108—53 |
| 3,160,120 | 12/1964 | Skhbie | 108—53 |
| 3,177,823 | 11/1965 | Entel | 108—53 |
| 3,195,481 | 7/1965 | Verguin | 108—53 |
| 3,224,388 | 12/1965 | Skhbie | 108—53 |

BOBBY R. GAY, Primary Examiner

G. O. FINCH, Assistant Examiner

U.S. Cl. X.R.

108—56